US006789256B1

(12) United States Patent
Kechriotis et al.

(10) Patent No.: US 6,789,256 B1
(45) Date of Patent: Sep. 7, 2004

(54) SYSTEM AND METHOD FOR ALLOCATING AND USING ARRAYS IN A SHARED-MEMORY DIGITAL COMPUTER SYSTEM

(75) Inventors: George Kechriotis, Arlington, MA (US); Dan Bernardo, Westwood, MA (US); Ming Fang, Marlborough, MA (US); Victor Fernandez, Andover, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/337,585

(22) Filed: Jun. 21, 1999

(51) Int. Cl.[7] .............................. G06F 9/46; G06F 9/54
(52) U.S. Cl. ...................... 719/312; 709/213; 711/147
(58) Field of Search .................... 709/312, 213; 719/312, 310, 313; 711/147–153

(56) References Cited

U.S. PATENT DOCUMENTS

| | | | | |
|---|---|---|---|---|
| 3,624,616 A | * | 11/1971 | Patel | 711/200 |
| 5,410,695 A | * | 4/1995 | Frey et al. | 719/313 |
| 5,528,761 A | | 6/1996 | Ooba et al. | |
| 5,537,569 A | | 7/1996 | Masubuchi | |
| 5,566,321 A | * | 10/1996 | Pase et al. | 711/153 |
| 5,659,714 A | * | 8/1997 | Yoshida | 711/211 |
| 5,659,778 A | * | 8/1997 | Gingold et al. | 712/11 |
| 5,710,881 A | | 1/1998 | Gupta et al. | |
| 6,061,771 A | * | 5/2000 | Bobak et al. | 711/169 |
| 6,092,166 A | * | 7/2000 | Bobak et al. | 711/169 |
| 6,108,693 A | * | 8/2000 | Tamura | 709/213 |
| 6,170,045 B1 | * | 1/2001 | Bobak et al. | 711/169 |
| 6,212,610 B1 | | 4/2001 | Weber et al. | |
| 6,266,716 B1 | * | 7/2001 | Wilson et al. | 710/33 |
| 6,367,069 B1 | * | 4/2002 | Corbett | 717/153 |

OTHER PUBLICATIONS

Nieplocha, J. et al. "Shared Memory NUMA Programming on I-Way." IEEE. 1996.*
Nieplocha, Jaroslaw et al. "Global Arrays: A Portable Shared-Memory" Programming Models for Distributed Memory Computers. IEEE. 1994.*
Nieplocha, J. et al. "The Global Array Programming Model for High Performance Scientific Computing." SIAM News, Aug./Sep. 1995.*
Nieplocha, Jarek et al. "Disk Resident Arrays: An Array-Oriented I/O Library for Out-of-Core Computations." Proc. Frontiers '96 of Massively Parallel Computing Symposium. 1996.*
Shih, Tien-Pao et al. "Grouping Array Layouts to Reduce Communication and Improve Locality of Parallel Programs." IEEE. 1994.*
Koelbel, Charles et al. "Programming Data Parallel Algorithms on Distributed Memory Machines Using Kali." ACM. 1991.*
Kaushik S. D. et al. "Multi-Phase Array Redistribution: Modeling and Evaluation." IEEE. 1995.*
Thakur, Rajeev et al. "Runtime Array Redistribution in HPF Programs." IEEE. 1994.*

* cited by examiner

Primary Examiner—Lewis A. Bullock, Jr.
(74) Attorney, Agent, or Firm—Meyertons Hood Kivlin Kowert & Goetzel, P.C.; B. Noël Kivlin; Rory D. Rankin (57) ABSTRACT

A computer system comprises a plurality of processes, each having an associated memory region, and a shared memory region shared by the processes. One of the processes is configured to control allocation of space for an array in the shared memory region, generate a descriptor therefor pointing to the allocate space and transmit the descriptor to the other processes. Therafter, all of the processes are configured to identify regions of the array for which they are to process data therein, and to perform predetermined processing operations in connection therewith.

13 Claims, 3 Drawing Sheets

SYSTEM AND METHOD FOR ALLOCATING AND USING ARRAYS IN A SHARED-MEMORY DIGITAL COMPUTER SYSTEM

FIELD OF THE INVENTION

The invention relates generally to the field of digital computer systems and methods, and more particularly to a system and method for allocating and using arrays in computer system, such as a symmetric multi-processor, constructed according to the shared memory architecture.

BACKGROUND OF THE INVENTION

Computers typically execute programs in one or more processes or threads (generally "processes") on one or more processors. If a program comprises a number of cooperating processes which can be processed in parallel on a plurality of processors, sometimes groups of those processes need to communicate to cooperatively solve a particular problem. Two basic architectures have been for multi-processor computer systems, namely, distributed memory systems and shared memory systems. In a computer system constructed according to the distributed memory architecture, processors and memory are allocated to processing nodes, with each processing node typically having a processor and an associated "node memory" portion of the system memory. The processing nodes are typically interconnected by a fast network to facilitate transfer of data from one processing node to another when needed for, for example, processing operations performed by the other processing node. Typically in a computer constructed according to the distributed memory architecture, a processor is able to access data stored in its node memory faster that it would be able to access data stored in node memories on other processing nodes. However, contention for the node memory on each processing node is reduced since there is only one processor, that is, the processor on the processing node, which accesses the node memory for its processing operations, and perhaps a network interface which can access the node memory to store therein data which it received from another processing node, or to retrieve data therefrom for transfer to another processing node.

Typically, in a computer system constructed according to the shared memory architecture, the processors share a common memory, with each processor being able to access the entire memory in a uniform manner. This obviates the need for a network to transfer data, as is used in a computer system constructed according to the distributed memory architecture; however, contention for the shared memory can be greater than in a computer system constructed according to the distributed memory architecture. To reduce contention, each processor can be allocated a region of the shared memory which it uses for most of its processing operations. Although each processor's region is accessible to the other processors so that they (that is, the other processors) can transfer data thereto for use in processing by the processor associated with the respective region, typically most accesses of a region will be by the processor associated with the region.

A computer system can be constructed according to a combination of the distributed and shared memory architectures. Such a computer system comprises a plurality of processing nodes interconnected by a network, as in a computer system constructed according to the distributed memory architecture. However, each processing node can have a plurality of processors which share the memory on the respective node, in a manner similar to a computer constructed according to the shared memory architecture.

Several mechanisms have been developed to facilitate transfer of data among processors, or more specifically, between processing node memories, in the case of a computer system constructed according to the distributed memory architecture, and/or memory regions, in the case of a computer system constructed according to the shared memory architectures. In one popular mechanism, termed "message passing," processors transfer information by passing messages thereamong. Several well-known message passing specifications have been developed, including MPI and PVM. Generally, in message passing, to transfer data from one processor to another, the transferring processor generates a message including the data and transfers the message to the other processor. On the other hand, when one processor wishes to retrieve data from another processor, the retrieving processor generates a message including a retrieval request and transfers the message to the processor from which the data is to be retrieved; thereafter, the processor which receives the message executes the retrieval request and transfers the data to the requesting processor in a message as described above.

A number of programs require processing of data organized in the form of multi-dimensional arrays. In a program processed in parallel by a number of processors in a computer system constructed according to either the shared memory architecture or the distributed memory architecture, portions of an array are distributed among the processors that are processing the program, and the processors process the data in their respective portions. If an n-dimensional array has dimensions $m_0 \times m_1 \times \ldots \times m_{n-1}$ ($m_x$, $x=0,1,\ldots,n-1$ being an integer), each item of data in the array is indexed by an "n-tuple" $[i_0, i_1, \ldots, i_{n-1}]$ ($i_0 \in 0, \ldots, m_0-1$, $i_1 \in 0, \ldots, m_1-1, \ldots, i_{n-1} \in 0, \ldots, m_{n-1}-1$). If, for example, the array is distributed among the "P" processors according to the last "m-th" dimension, then the set of data items associated with a "first" processor $p_0$ will, if "$m_{n-1}$" is divisible by "P," correspond to $[i_0, i_1, \ldots, i_{n-1}]$ ($i_0 \in 0, \ldots, m_0-1, i_1 \in 0, \ldots, m_1-1, \ldots, i_{n-1} \in 0, \ldots, (m_{n-1}/P)-1$), the set associated with a "second" processors $p_1$ will correspond to $[i_0, i_1, \ldots, i_{n-1}]$ ($i_0 \in 0, \ldots, m_0-1, i_1 \in 0, \ldots, m_1-1, \ldots, i_{n-1} \in (m_{n-1}/P), \ldots, (2m_{n-1}/P)-1$), and so forth, with generally, the set associated with a "p-th" processor $P_p$ will correspond to $[i_0, i_1, \ldots, i_{n-1}]$ ($i_0 \in 0, \ldots, m_0-1, i_1 \in 0, \ldots, m_1-1, \ldots, i_{n-1} \in ((p+1)m_{n-1}/P), \ldots, m_{n-1}-1$). Decompositions and distributions along other dimensions will be apparent to those skilled in the art.

If the data needs to be redistributed, for example, during a matrix transpose, to form another array, the processors can transmit the data in their respective portions to the memories of the other processors as described above. In the following discussion, it will be assumed that the parallel program is being processed by a computer system constructed in accordance with the shared memory architecture. Generally, in that operation, the transfer is performed using a common pool of shared memory that is accessible by all of the processors. When a processor is to transfer data to another processor, it copies the data to a predetermined location in the common pool. The processor to which the data is being transferred, when it determines that the data has been copied to the predetermined location, then copies the data to its local memory space. Thus, transferring data from one processor to another requires to copy operations.

SUMMARY OF THE INVENTION

The invention provides a new and improved system and method for allocating and using arrays in a computer system, such as a symmetric multi-processor, constructed according to the shared memory architecture.

In brief summary, the invention provides a computer system comprising a plurality of processes, each having an associated memory region, and a shared memory region shared by the processes. One of the processes is configured to control allocation of space for an array in the shared memory region, generate a descriptor therefor pointing to the allocate space and transmit the descriptor to the other processes. Therafter, all of the processes are configured to identify regions of the array for which they are to process data therein, and to perform predetermined processing operations in connection therewith.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
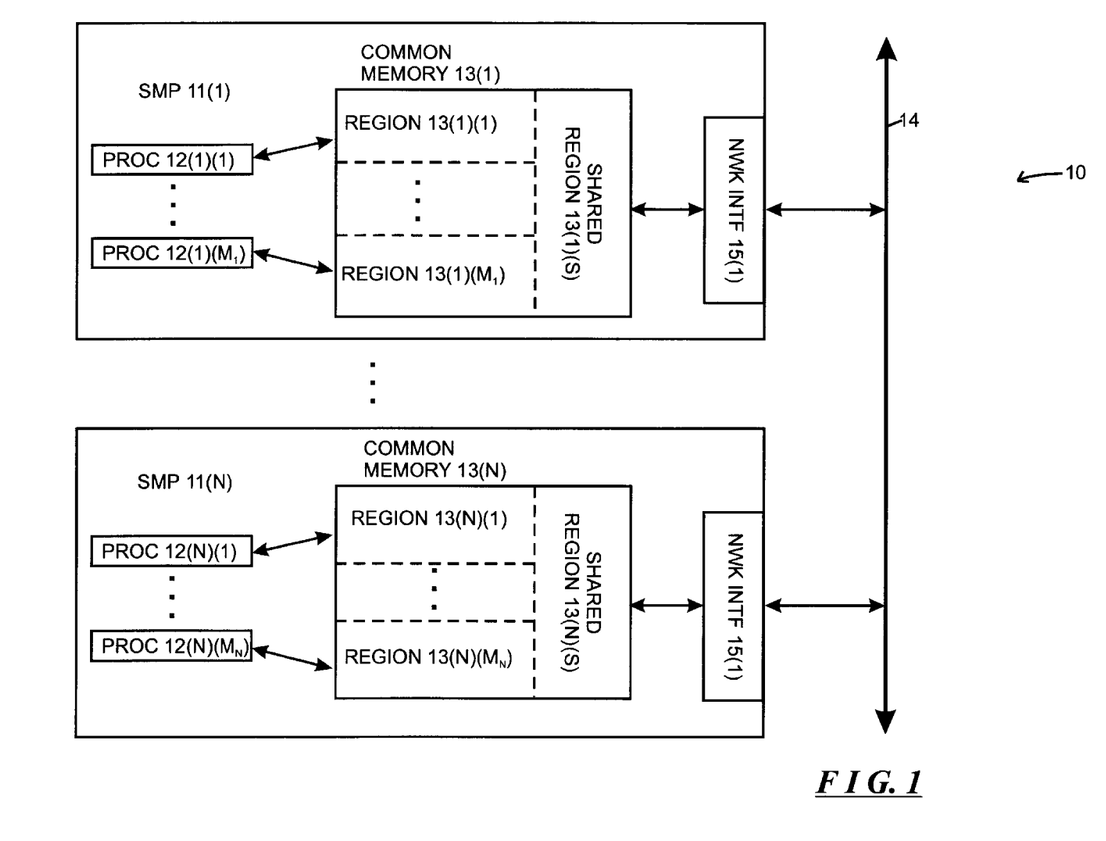
FIG. 1 schematically depicts a computer system including an arrangement for allocating and using arrays in a shared memory region of a shared-memory computer system, constructed in accordance with the invention.

FIG. 1 schematically depicts a computer system including an arrangement for allocating and using arrays in a shared memory region of a shared-memory computer system, constructed in accordance with the invention. Generally, the computer system 10 includes one or more computers 11(1) through 11(N) (generally identified by reference numeral 11(n)), interconnected by a network represented by communication link 14. At least some of the computers 11(n) are constructed along a symmetric multi-processor ("SMP") architecture, with each SMP including hardware resources comprising a plurality of processors (not separately shown) which share common memory resources (also not separately shown). In the following, it will be assumed that the computers 11(n) are all constructed along the lines of an SMP architecture, and may also be referenced as SMP's 11(n). In the computer 10 depicted in FIG. 1, each SMP 11(n) can process in parallel a plurality of processes or threads (generally, "processes") 12(1)(1) through 12(N)(M) (generally identified by reference numeral 12(n)(m)) organized in one or more programs. The processes 12(n)(m) in each SMP 11(n) share a common memory 13(n), with each process being allocated a region 13(n)(m) of the memory 13(n). The total number of processes 12(n)(m) which each SMP 11(n) can execute may be greater than the total number of processors which the respective SMP 11(n) maintains, and, if so, the computer's operating system (not shown) will enable the processes to be executed in a series of time intervals or slots, with selected ones of the processes 12(n)(m) being executed at any point in time.

As noted above, each process 12(n)(m) is allocated a region 13(n)(m) of the common memory 13(n), which it will normally use in its processing operations. Each memory 13(n) also contains a shared region of memory, identified by reference numeral 13(n)(S), which is accessible to all of the processes 12(n)(m). Each process 12(n')(m') can communicate with another process 12(n')(m") (m"≠m')) to send information thereto by sending one or more messages thereto. The messages effectively result in the storing of information in the memory region 13(n')(m") of memory 13(n') allocated to that process 12(n')(m"). A number of message passing methodologies which may be used by the processes 12(n)(m) are known to those skilled in the art. After the information has been stored into the memory region 13(n')(m") allocated to that process 12(n')(m"), the process 12(n')(m") can use the information in its processing operations.

As noted above, the SMP's 11(n) are interconnected by a communication ink 14. Each SMP also includes a network interface 15(n) to connect the respective SMP 11(n) to the communication link 14 to facilitate transfer of information among the SMP's 11(n), and specifically among processes 12(n)(m) maintained thereby. For example, a process 12(n') (m') can communicate with another process 12(n")(m") (where n"≠n', but m" may equal m') to send information thereto by sending one or more messages thereto. In that case, the messages will be transmitted by the network interface 15(n') of SMP 11(n') and transmitted over the communication link 14 to the network interface 15(n") of SMP 11(n"), and the network interface 15(n") will, in turn, store the information in the memory region 13(n")(m") associated with the process 12(n")(m"). After the information has been stored into the memory region 13(n")(m") allocated to that process 12(n")(m"), the process 12(n")(m") can use the information in its processing operations.

The invention provides an arrangement for allocating and using arrays in a computer system, such as a symmetric multi-processor, constructed according to the shared memory architecture, which will reduce the amount of time required to process an array. Generally, an n-dimensional array has dimensions $m_0 \times m_1 \times \ldots \times m_{n-1}$ ($m_x$, x=0,1,...,n−1 being an integer), each item of data in the array being indexed by an "n-tuple" $[i_0, i_1, \ldots, i_{n-1}]$ ($i_0 \in 0, \ldots, m_0-1$, $i_1 \in 0, \ldots, m_1-1, \ldots, i_{n-1} \in 0, \ldots, m_{n-1}-1$). If, for example, the array is distributed among "P" processes, which will be identified by reference numeral 12(p), according to the last "m-th" dimension, then the set of data items associated with a "first" process 12(0) will, if "$m_{n-1}$" is divisible by "P," correspond to $[i_0, i_1, \ldots, i_{n-1}]$ ($i_0 \in 0, \ldots, m_0-1$, $i_1 \in 0, \ldots, m_1-1, \ldots, i_{n-1} \in 0, \ldots, (m_{n-1}/P)-1)$, the set associated with a "second" process 12(1) will correspond to $[i_0, i_1, \ldots, i_{n-1}]$ ($i_0 \in 0, \ldots, m_0-1$, $i_1 \in 0, \ldots, m_1-1, \ldots, i_{n-1} \in (m_{n-1}/P), \ldots, (2m_{n-1}/P)-1)$, and so forth, and generally, the set associated with a "p-th" process 12(p) will correspond to $[i_0, i_1, \ldots, i_{n-1}]$ ($i_0 \in 0, \ldots, m_0-1$, $i_1 \in 0, \ldots, m_1-1, \ldots, i_{n-1} \in ((p+1)m_{n-1}/P), \ldots, m_{n-1}-1)$. Decompositions along other dimensions and distributions thereof to the various processes 12(p) will be apparent to those skilled in the art.

Figure 2:
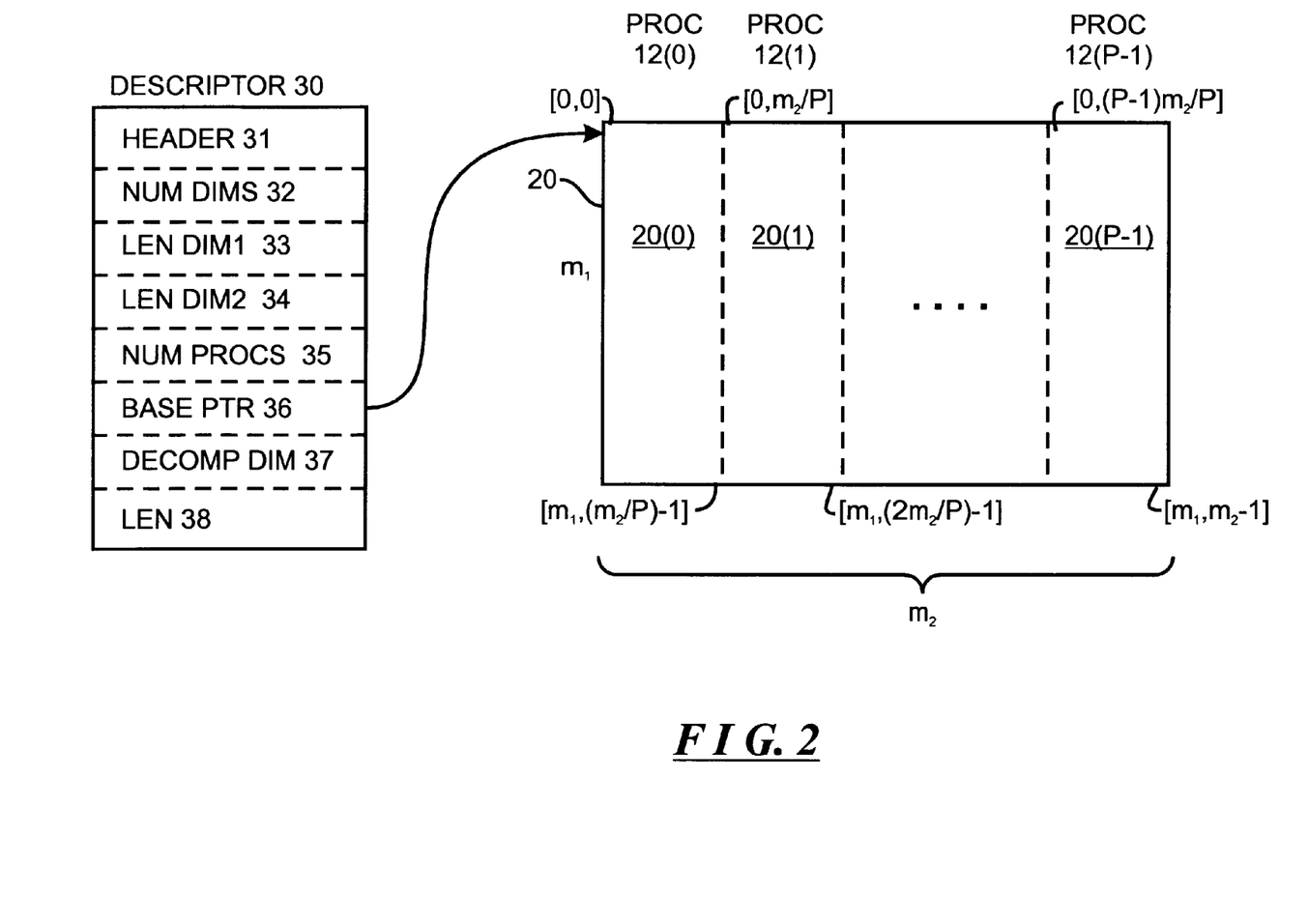
FIG. 2 schematically depicts data structures useful in understanding the invention.

This will be described in connection with FIG. 2. FIG. 2 depicts a two-dimensional $m_1 \times m_2$ array 20 which has been decomposed along the second dimension for processing by the processes 12(p). In that decomposition, the array is divided into a plurality of sub-arrays 20(0) through 20(P−1) (generally identified by reference numeral 20(p)), with sub-array 20(0) to be processed by process 20(0), sub-array 20(1) to be processed by process 20(1), and so forth. The array is decomposed so that sub-array 20(0) comprises data elements having indices $[i_1, i_2]=[0,0]$ through $[m_1,(m_2/P)-1]$, sub-array 20(1) comprises data elements having indices $[i_1, i_2]=[0,(m_2/P)]$ through $[m_1,(2m_2/P)-1]$, and generally sub-array 20(p) comprises $[i_1, i_2]=[0,pm_2/P]$ through $[m_1,$ ((p+1)$m_2$/P)−1], Typically, conventionally each of the processes 12(p) would allocate an $m_1$x($m_2$/P) portion of its respective memory region 13(p) in which it will store its respective sub-array 20(p) of the array 20. In that case, when a process 12($p_S$) needs to transfer some or all of its sub-array 20($p_S$) to one or more other processes 12($p_{D1}$), 12($p_{D2}$), . . . it will copy the data in the sub-array from its region 13($p_S$) to a predetermined location another region of memory, such as the shared region or the region 13($p_{D1}$), 13($p_{D2}$), . . . associated with the destination process 12($p_{D1}$), 12($p_{D2}$), . . . , and the destination process 12($p_{D1}$), 12($p_{D2}$), . . . will thereafter copy the data to a region allocated therefor in its respective region 13($p_{D1}$), 13($p_{D2}$), . . . of memory.

In accordance with the invention, to reduce the number of copy operations required to transfer data, in the form of arrays, among processes 12(p) executing a parallel program, instead of requiring each process 12(p) to allocate a portion of its respective memory region 13(p) in which it will store its respective sub-array 20(p) of the array 20, and performing processing operations in connection therewith, the storage space for the array is allocated in the shared memory region, illustratively, region 13(n)(S), and the processes 12(p) process the data in the array as stored in the shared memory region. To accommodate that, one of the processes, illustratively process 12(0), will issue a request to the operating system to allocate a region of memory, in the shared memory region 13(n)(S), in which the array 20 is to be stored. After the operating system has allocated the requested region, the process 12(0) may enable the data comprising the array elements to be loaded therein.

In addition, the process 12(0) will generate an array descriptor for the array 20, the array descriptor describing the array's location in the shared memory region 13(n)(S), the number and ordering of the dimensions as the array is stored in the memory's address space, the extent $m_0, m_1, \ldots m_{n-1}$ along each dimension, and the dimension or dimensions of the array along which the array is to be decomposed. The array descriptor may describe .the array's location by identifying the address, in the memory 13(n), at which a predetermined array element, illustratively, element [0,0], is located. In addition, the descriptor may identify the number of array elements, which corresponds to the length of the portion of the shared memory in which the array is stored. The descriptor may also include other information, including for example, the data type of the data comprising the array elements, such as, for example, whether the data is in integer, floating point, ASCII text, a structure form and the like.

Details of an illustrative descriptor, identified by reference numeral 30, for the array depicted in FIG. 2 are also shown in FIG. 2. With reference to FIG. 2, descriptor 30 may include, for example, a header field 31, a number of dimensions field 32, a series of dimension length fields 33 and 34 (in the case of two-dimensional array 20), a number of processes field 35, a base pointer field 36, a decomposition dimension field 37 and a length field 38. The descriptor 30 may also include other information in other fields (not shown), including, for example, data type information for the array elements comprising the array. The header field 31 may contain, for example, an identifier or handle for the array. The number of dimensions field 32 identifies the number of dimensions for the array, and the dimension length fields 33 and 34 identify the lengths, corresponding to values $m_1$ and $m_2$ for the array 20, of the successive dimensions in the array. It will be appreciated that, if the array has fewer or more than two dimensions, as indicated by the value in the number of dimensions field 32, the descriptor 30 will include a corresponding increased or decreased number of dimension length fields.

The number of processes field 35 identifies the number "P" of processes 12(p) that are to process the array, and thus the number of portions 20(p) into which the array is to be divided. It will be appreciated that, if the processes 12(p) know "P" a priori, the descriptor 30 need not include the field 35.

The base pointer field 36 points to a base storage location for the array, preferably the element identified by tuple [0,0]. The decomposition dimension field 37 contains a value that identifies the dimension or dimensions along which the array is to be decomposed; in the illustrative array 20, the array is decomposed along the second dimension (of length $m_2$). Finally, the length field 38 identifies the total length of the array 20. The total length may identify the number of array elements, which should correspond to the contents of the dimension length fields multiplied together, the total number of bytes for the array, or any other convenient measure. If the contents of the total length field 38 identify the number of array elements, they may be used in part to verify that the information in that field and the dimension length fields 33 and 34 is correct.

After the processor 12(0) has generated the descriptor, it can broadcast the array descriptor to the other process 12(1) through 12(P−1). Each process 12(p) can, after it receives the array descriptor, can use the information in the descriptor, along with the number "P" corresponding to the number of sub-arrays 20(p) in to which the array 20 is to be divided, to determine the location in the shared memory of its respective portion 20(p) of the array 20, and, in particular, the address of the first array element, for example, array element [0,((p+1)$m_2$/P)−1] in the illustrative two-dimensional array as described above in connection with FIG. 2. From that offset and the other information in the descriptor, the respective process 12(p) can also determine the location of each of the other array elements in its respective sub-array 20(p) of the array 20. In addition, each process 12(p) can use the length information in the descriptor to verify that each of the array elements in its sub-array 20(p) is stored in the portion of the shared memory allocated for the array, which can ensure that the descriptor was correctly received. The process 12(0) can use any convenient mechanism for broadcasting information to other processes 12(p) to broadcast the descriptor to the other processes, including, for example, the broadcast mechanism described in U.S. Pat. application Ser. No. 09/303,465, filed Apr. 30, 1999 still pending in the name of Rolf H. vandeVart, et al., and entitled "System And Method For Facilitating Communication Among A Plurality Of Processes In A Digital Computer System," and assigned to the assignee of the present invention (incorporated by reference).

After the processes 12(p) have generated (in the case of process 12(0)) or received (in the case of processes 12(1) through 12(P−1)) the descriptor, they may process the array elements in their respective sub-array directly in the shared memory 13(n)(S), without having to transfer them to their respective memory regions. In addition, if the processes 12(p) are to perform, for example a matrix transposition, in which a new matrix is generated in which indices along two dimensions are interchanged, if both the original and transposed matrices are stored in portions of memory allocated in the shared memory 13(n)(S), each process 12(p) can participate in the transposition operation by copying the array elements from their respective locations in memory associated with the original matrix, to the appropriate locations in memory associated with the transposed matrix using, for example, a conventional all-to-all collective communication mechanism. It will be appreciated that, prior to performing the transposition operation, the region of memory in which the transposed matrix is to be stored will be allocated in a manner similar to the original matrix, and a descriptor therefor generated and broadcast to the processes $12(p)$ which are to participate in the transposition operation. It will further be appreciated that, the respective processes $12(p)$ need perform only one copy operation for each array element to copy the array element from the location in the original matrix to the location in the transposed matrix. It will further be appreciated that, if either or both of the original and/or transposed matrices are allocated portions of memory in the processes' respective regions $13(n)(p)$, the processes $12(p)$ can use conventional message passing mechanisms for performing the transposition operation, which, as noted above, would typically require two copy operations.

Figure 3:
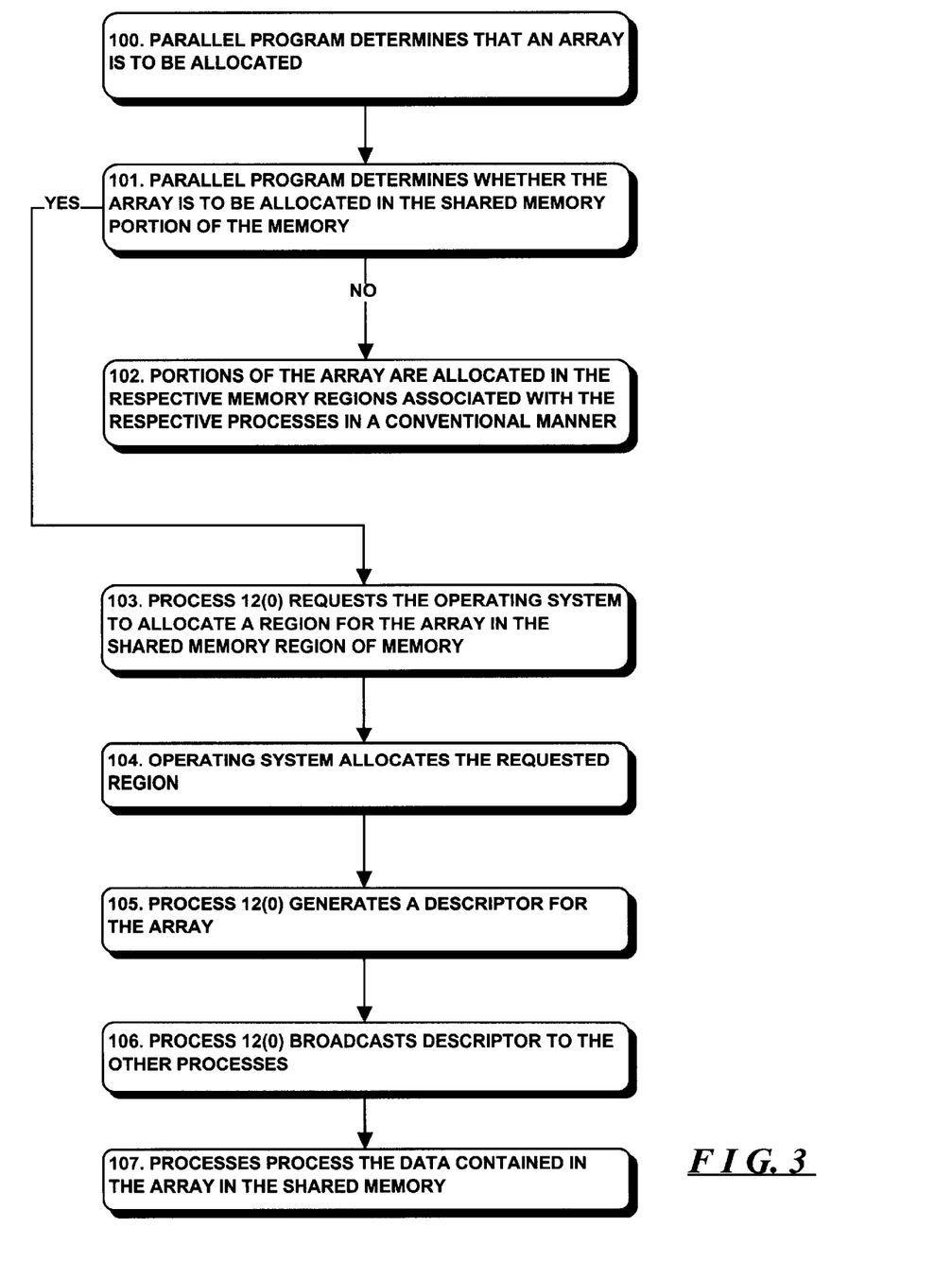
FIG. 3 is a flow chart depicting operations performed by the arrangement described in connection with FIGS. 1 and 2.

With this background, operations performed by the computer system 10 in connection with the invention will be described in connection with the flowchart depicted in FIG. 3. With reference to FIG. 3, when a parallel program determines that an array is to be allocated (step 100), the program (or one or more of the processes) initially determines whether the array is to be allocated in the shared memory portion $13(n)(S)$ of the memory 13 (step 101). If the program makes a negative determination in step 101, the portions of the array are allocated in the respective memory regions $13(p)$ associated with the respective processes $12(p)$ in a conventional manner (step 102).

On the other hand, if the program makes a positive determination in step 102, one of the processes, identified as process 12(0), requests the operating system to allocate a region in the shared memory $13(n)(S)$ region of memory $13(n)$ for the array (step 103). After the operating system has allocated the necessary region (step 104), the process 12(0) generates a descriptor 30 for the array (step 105) and broadcasts it to the other processes (step 106). Thereafter, the processes can process the data contained in the array in the shared memory (step 107).

The invention provides a number of advantages. In particular, it provides an arrangement for allocating a region of memory shared among a plurality of processes for use in storing an array, whose array elements will be processed in parallel by the processes, and can facilitate, for example, faster processing of transposition and other operations requiring reorganization of array elements with fewer copy operations than might otherwise be required.

It will be appreciated that a number of modifications may be made to the system 10 described above. For example, the order of operations described in connection with FIG. 3 may differ from that described therein. In addition, the information contained in descriptor 30 may differ from that described above in connection with FIG. 2.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. The computer system as recited wherein in response to receiving said descriptor, each of said plurality of processes is configured to:
   identify a subunit of said subunits of said array for which they are to process data therein; and
   process elements within the identified subunit directly within the shared region.

2. The computer system as recited in claim 1, wherein said common memory is within a symmetric multiprocessing (SMP) node, and wherein each of said plurality of processes are executing on a separate processing unit of said first SMP node.

3. The computer system as recited in claim 2, further comprising one or more additional SMP nodes coupled to said first SMP node via an interconnect.

4. The computer system as recited in claim 3, wherein said first process is further configured to convey said descriptor to a process executing in a node of said additional nodes, and wherein the process executing in said additional node is configured to:
   identify a subunit of said subunits of said array for processing; and
   process elements within the identified subunit directly within the shared region.

5. The computer system as recited in claim 1, wherein said indication as to how many subunits said array is to be divided comprises a number of processes that are to process the array.

6. The computer system as recited in claim 1, wherein each of said plurality of processes is configured to identify a subunit of said subunits based upon (1) the number of dimensions of the array, (2) the indication as to how many subunits the array is to be divided, and (3) the decomposition dimension field.

7. The computer system as recited in claim 1, wherein said array comprises a matrix of two dimensions, and wherein said plurality of processes are further configured to perform a transposition of said matrix, wherein in performing said transposition,
   said first process is configured to:
      allocate space for a transpose matrix in said shared region;
      generate a transpose matrix descriptor corresponding to said transpose matrix; and
      convey said transpose matrix descriptor to each of said plurality of processes;
   each of said plurality of processes is configured to:
      utilize said transpose matrix descriptor to identify a subunit of said transpose matrix which corresponds to the respective process; and
      copy elements from their respective identified subunit of the array directly to the identified subunit of the transpose matrix.

8. The method as recited in claim 1, wherein in response to receiving said descriptor, said method further comprises each of said plurality of processes:

identifying a subunit of said subunits of said array for which they are to process data therein; and processing elements within the identified subunit directly within the shared region.

9. The method as recited in claim 8, wherein said common memory is within a symmetric multiprocessing (SMP) node, and wherein each of said plurality of processes are executing on a separate processing unit of said first SMP node.

10. The method as recited in claim 9, wherein one or more additional SMP nodes are coupled to said first SMP node via an interconnect, and wherein said method further comprises said first process conveying said descriptor to a process executing in a node of said additional nodes, and wherein the process executing in said additional node is configured to:

identify a subunit of said subunits of said array for processing; and process elements within the identified subunit directly within the shared region.

11. The method as recited in claim 8, wherein said indication as to how many subunits said array is to be divided comprises a number of processes that are to process the array.

12. The method as recited in claim 8, wherein each of said plurality of processes is configured to identify a subunit of said subunits based upon (1) the number of dimensions of the array, (2) the indication as to how many subunits the array is to be divided, and (3) the decomposition dimension field.

13. The method as recited in claim 8, wherein said array comprises a matrix of two dimensions, and wherein said plurality of processes are further configured to perform a transposition of said matrix, wherein in performing said transposition, said method further comprises said first process:

allocating space for a transpose matrix in said shared region;

generating a transpose matrix descriptor corresponding to said transpose matrix; and conveying said transpose matrix descriptor to each of said plurality of processes;

and each of said plurality of processes:

utilizing said transpose matrix descriptor to identify a subunit of said transpose matrix which corresponds to the respective process; and copying elements from their respective identified subunit of the array directly to the identified subunit of the transpose matrix.

* * * * *

UNITED STATES PATENT AND TRADEMARK OFFICE
CERTIFICATE OF CORRECTION

PATENT NO. : 6,789,256 B1
DATED : September 7, 2004
INVENTOR(S) : Kechriotis et al.

It is certified that error appears in the above-identified patent and that said Letters Patent is hereby corrected as shown below:

Column 8,
Line 14, please replace "The computer system as recited" with
-- A computer system comprising: a plurality of processes;
and a common memory configured for use by said plurality of processes, wherein said common memory comprises:
a plurality of separate regions, each of said regions being allocated to a different one of said plurality of processes; and
a shared region configured for use by all of said plurality of processes; wherein a first process of said plurality of processes is configured to:
allocate space for an array in said shared region;
generate a descriptor corresponding to said array, said descriptor including:
    (1) a base pointer which identifies a storage location of said array within said shared region;
    (2) the number of dimensions of the array;
    (3) an indication as to how many subunits said array is to be divided; and
    (4) a decomposition dimension field; and convey said descriptor to each of said plurality of processes, excepting said first process; --

Column 9,
Lines 1-7, please replace the entire claim with
-- A method for processing arrays, said method comprising:
    executing a plurality of processes, each of said processes being configured to share a common memory;
partitioning a first region of said common memory into a plurality of separate regions,
    each of said separate regions being allocated for use by a different process of said plurality of processes;
allocating a second region of said common memory as a shared region, said shared
    region being configured for use by all of said plurality of processes;
a first process of said plurality of processes:
    allocating space for an array in said shared region;
    generating a descriptor corresponding to said array, said descriptor including:

UNITED STATES PATENT AND TRADEMARK OFFICE
CERTIFICATE OF CORRECTION

PATENT NO.    : 6,789,256 B1
DATED         : September 7, 2004
INVENTOR(S)   : Kechriotis et al.

It is certified that error appears in the above-identified patent and that said Letters Patent is hereby corrected as shown below:

Column 9 (cont'd),
            (1) a base pointer which identifies a storage location of said array within said shared region;
            (2) the number of dimensions of the array;
            (3) an indication as to how many subunits said array is to be divided; and
            (4) a decomposition dimension field; and
conveying said descriptor to each of said plurality of processes, excepting said first process wherein in response to receiving said descriptor, each of said plurality of processes is configured to: identify a subunit of said subunits of said array for which they are to process data therein, and process elements within the identified subunit directly within the shared region. --

Signed and Sealed this

Twenty-eighth Day of December, 2004

JON W. DUDAS
*Director of the United States Patent and Trademark Office*